May 11, 1948.	B. N. ENGLE ET AL	2,441,403
TEETH SETTER FOR SAWS
Filed July 5, 1945	3 Sheets-Sheet 1
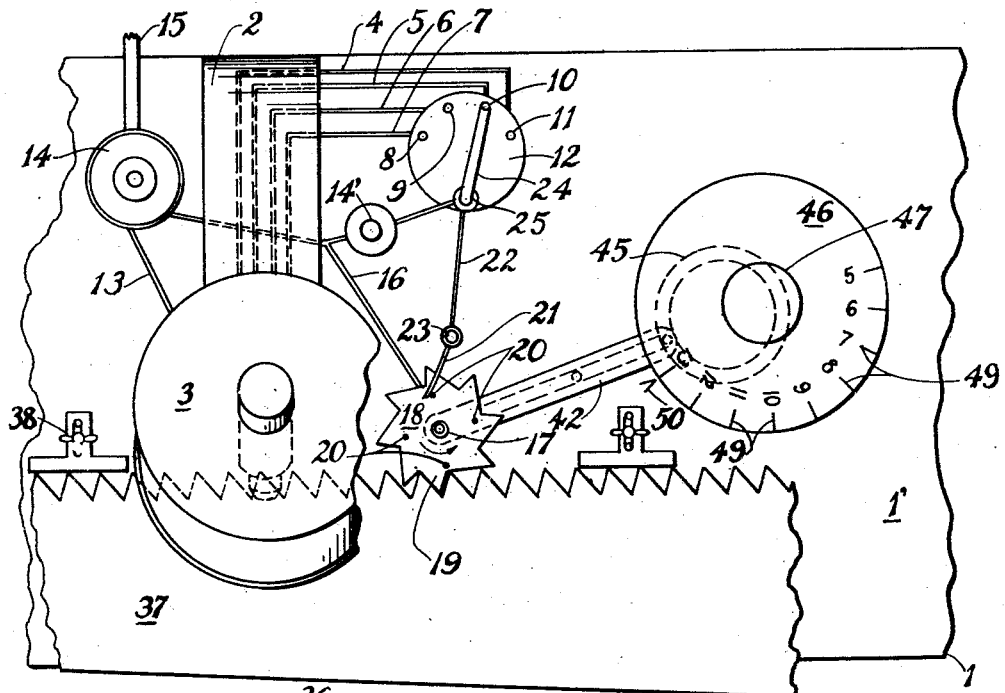
Fig. 1.
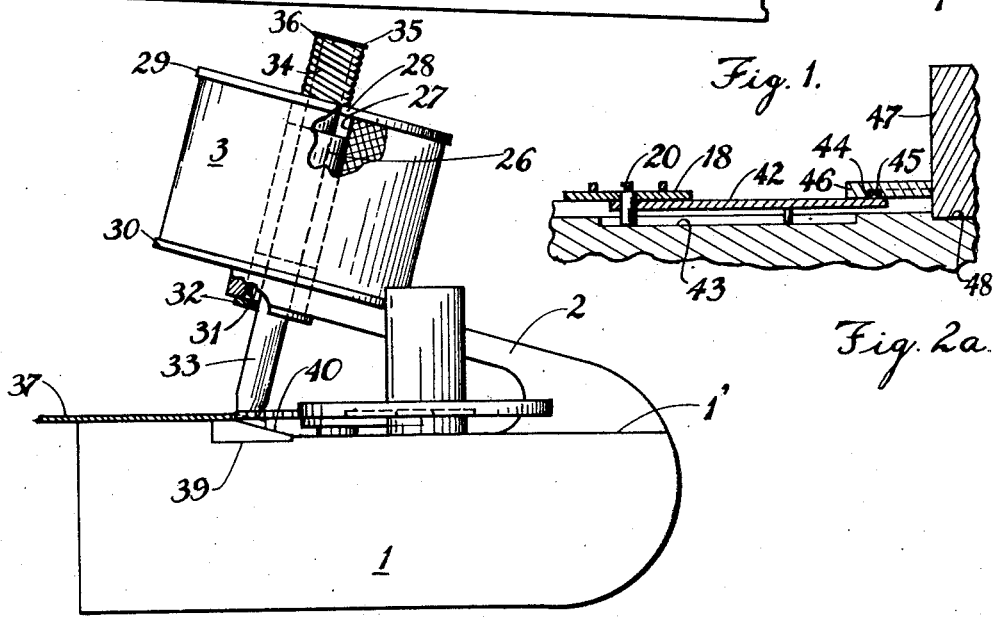
Fig. 2.
Fig. 2a.
INVENTORS
BURR N. ENGLE AND
JOHN B. ENGLE
BY Earl E Moore
Atty.

May 11, 1948.  B. N. ENGLE ET AL  2,441,403
TEETH SETTER FOR SAWS
Filed July 5, 1945   3 Sheets-Sheet 2

INVENTORS
BURR N. ENGLE AND
JOHN B. ENGLE
BY Earl E. Moore
Atty.

Patented May 11, 1948

2,441,403

UNITED STATES PATENT OFFICE 2,441,403

TEETH SETTER FOR SAWS

Burr N. Engle and John B. Engle,
Los Angeles, Calif.

Application July 5, 1945, Serial No. 603,288

5 Claims. (Cl. 76—58)

Saw teeth must be set, that is, positioned or adjusted laterally, so that the blade of the saw will not stick or become lodged in the groove being cut. The devices disclosed herein are designed for setting the teeth of saws and the like, and for doing it automatically and perfectly. The work is done by simply passing the blade of the saw through the device, teeth being set at whatever speed the blade is moved. So far as known, there are no simple automatic devices capable of rapidly setting the teeth of saws, which are portable, and which can be sold at a reasonably low price.

The automatic saw setting devices of this invention include a hammer element for bending every other tooth to one side of the blade and which is actuated by energy controlled by the saw teeth that have been set, thus, eliminating much auxiliary equipment which obviously would greatly increase the cost of the devices. The energy for working the hammer may be controlled by either the teeth of the saw which have been set or by the teeth of the saw which have not as yet been set.

The devices as set forth in this particular application may be combined with the tooth cutter disclosed in the application of Burr N. Engle, Serial Number 540,167, filed June 13, 1944, which issued as Patent No. 2,407,821, dated September 17, 1946, and combined in a manner so that the tooth setter disclosed herein sets the teeth of the saw as it is toothed, in other words, the machines disclosed in both applications could be combined into a single operating machine.

One of the principal objects of this present invention is to present a new and novel teeth setting machine that is simple and sturdy in construction, easy and economical to manufacture, which is automatic in operation, and which is substantially foolproof.

Another object is to provide an automatic teeth setting machine in which the operator need only run the blade of the saw along a pair of guides in order to fully set the teeth of the saw, the teeth being set at a rapid pace and done in a perfect manner.

Still another object is to provide a teeth setting machine with fully automatic control means for actuating the hammer which sets alternate teeth, the control means having contact with the teeth of the saw at a point either before the teeth are set or after they are set.

Other objects, advantages and features of our invention will appear from the accompanying drawings, the subjoined detailed description, the preamble of these specifications, and the appended claims.

Applicants are about to illustrate and describe one of the forms of their invention in order to teach one how to make, and use the same, but it is to be understood that the drawings and description thereof are not to limit the invention in any sense whatsoever, except as limited by the appended claims.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

In the drawings:

Fig. 1 is a plan view of one form of the invention, parts thereof being broken off, Fig. 2 is a cross sectional view of Fig. 1, Fig. 2a is a vertical cross sectional view taken along the bar 42.

Figure 3:
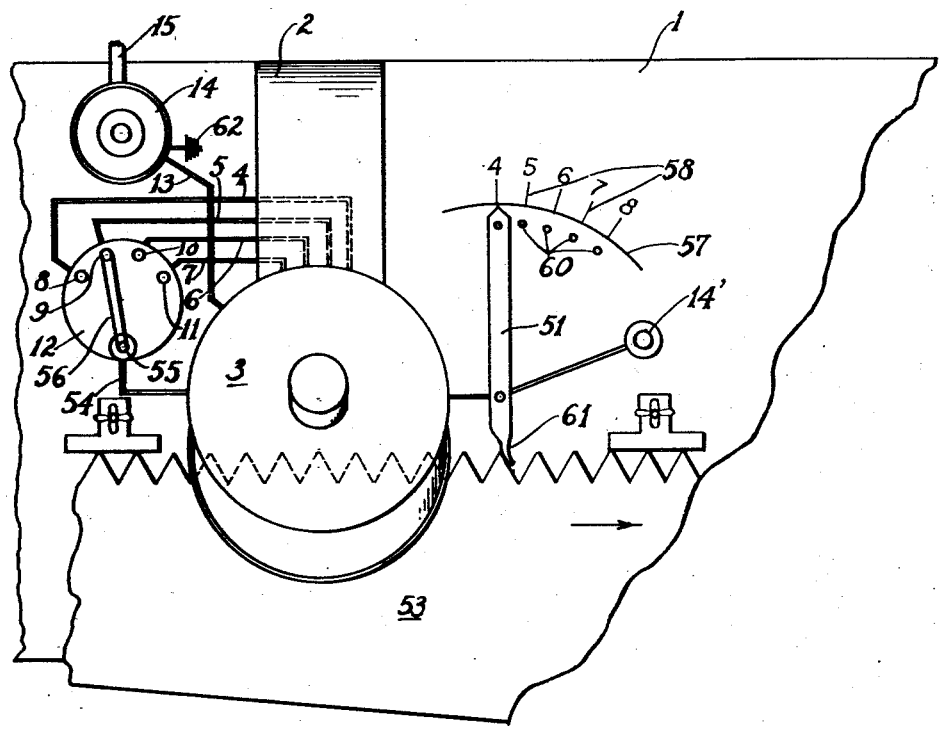
Fig. 3 is a plan view of another form of the invention with parts thereof broken away.

The invention comprises a machine having a heavy metal base 1 with an extended arm 2 for supporting a solenoid 3 over the site where the tooth setting is accomplished. The solenoid is wound as one coil with four taps therefrom, the taps of the coil each having an insulated conductor wire extending therefrom, like 4, 5, 6 and 7, which connect onto their respective switch contact points 8, 9, 10 and 11, of the distributor switch body 12. The other end of the solenoid coil has an end which is connected to the insulated wire 13 that connects with the low side of the power supply switch 14. The coil 3 is one continuous winding of a suitable size insulated copper wire and it is tapped, at its opposite end from where it is connected to the lead wire 13, at a number of places, for instance, at every twenty convolutions, so that the switch arm 24 can be set onto any one of the buttons 8 to 11 and thus vary the strength of the electro-magnetic flux in the coil 3 and hence vary the force of the hammer or plunger 33 of the coil. This variation of force in the coil for the hammer 33 is desired in that all the metal teeth of a saw are not made of the same strength of steel or thickness and such a coil should be capable of setting strong teeth as well as the weaker ones. The switch 14 is a single pole variety and with it is connected a source of suitable electric current by the two wire cord 15, one of the wires of which connects with the high side of switch 14, and the other wire of the cord, as indicated at 16, leads to the bottom pivot-conductor-pin 17 of a toothed switching wheel 18. This wheel is provided with a plurality of teeth 19 which match the teeth of the saw to be set, and the top of the wheel is provided with a plurality of contact posts 20, one post to every other tooth on the wheel. The wheel and the posts are connected conductors of electricity, and the posts are arranged for making contact with a spring arm 21 which is connected to an insulated wire 22 at the fixed insulator pivot post 23. The wire 22 connects with the conductor arm 24 of the distributor switch 12 at the pivot post 25 thereof, this post being insulated from the base 1. A shunt wire including a push bottom type of switch 14' is provided so that the operator can operate the plunger of the solenoid independently of the automatic means.

By the foregoing arrangement, the electrical circuit is complete so that one section of the winding of the solenoid, depending upon the position of the distributor arm 24, will be energized providing the switch 14 is closed. Such energization of the solenoid will cause a plunger 26 thereof to move downwardly with a sharp blow. This plunger slides in a bore 27 of the solenoid and is prevented from leaving the bore by the annular lips 28 of the top and bottom end discs 29 and 30 of the solenoid. The solenoid is affixed to the arm 2 in any suitable manner, and its bore is alined with a hole 31 in the arm and within which is a guide bushing 32 affixed thereto. A reduced portion 33 of the plunger extends downwardly and has its extreme end hardened and shaped to engage the teeth of the saw blade and bend them. Another reduced portion 34 of the plunger extends upwardly and is capped with a disc 35 which is affixed thereto and which is a stop plate for the coil spring 36. The function of the spring is to keep the plunger raised until a portion of the winding of the solenoid is energized. The control wheel 18 may be either on the advance or retracting side of the plunger 33 in that the teeth of this wheel will rapidly mesh with the teeth of the saw before or after being set.

The blade of the saw to be set is indicated at 37, and an adjustable stop 38 is provided to cooperate with the wheel 18 for alining the blade of the saw with the plunger position. Countersunk in the top surface 1' of the base is an anvil 39 having its top surface 40 inclined at the correct angle to which the teeth of the saw are to be set. This anvil may be attached to the base in any suitable manner, or just layed into a recess sized and configurated for the anvil since there would be no lifting forces to displace the anvil.

A plurality of wheels 18 are provided for each machine in that this wheel would have to be changed in size and tooth design to properly work with different size saws and to mesh with the variously shaped teeth of the different saws, as some of the saws may be rip saws, others may be cross cut saws, etc. When the size of the wheel 18 is changed, its position relative to the plunger must be changed, the smaller wheels must be moved closer to the plunger than the large wheels. Fig. 1 shows the smallest wheel employed in this particular arrangement, but smaller wheels for finer tooth saws may be employed, if desired. To adjust the position of the wheel 18 with respect to the plunger, the wheel pintle 17 is fixed to a shiftable bar 42, the pintle extending below the bar and riding in a straight guide-groove 43. This guide groove, as shown in dotted lines in Fig. 1, is in alinement with the pivot points of parts 18 and 46. The other end of the bar has an integral pin 44 extending upwardly therefrom which rides in a cam-like circular groove 45 in the under surface of a wheel 46. At the center of this wheel is a finger knob 47 which is fixed to the wheel 46 and is journalled in a recessed portion 48 of the base 1. Around the curved edge of the wheel are a number of divisional lines or marks 49, all of which indicate variously sized teeth in a saw and are arranged consecutively, for instance, the number 6 indicates a 6 point saw or a saw which has 6 tooth points per inch. The arrow 50 is provided to indicate the correct position of the numbered lines 49 when their respective point saws are to be set. Whenever a larger toothed saw is to be set, for instance, a 5 point saw, the finger knob 47 is rotated until the number 5 is alined with the arrow 50; such an action causing the cam-like groove 45 to pull the bar 42, which is parallel with guide-groove 43 and thus further space the pivot 17 from the saw blade. After this setting is made, the correct sized wheel 18 is placed on the pivot pin 17. The bar 42 is maintained parallel with its guide-groove because the bar is rigid and has a pair of pins fixed to the underside thereof which slide along the groove.

Figure 4:
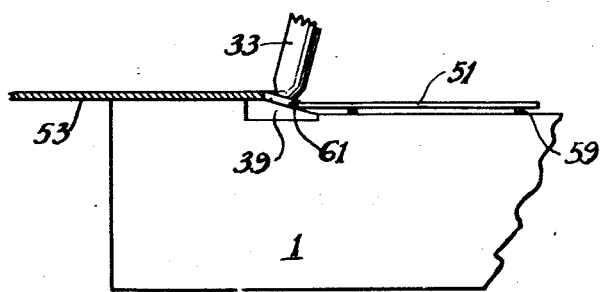
Fig. 4 is a cross sectional view of Fig. 3 with portions broken away.

The form of the invention shown in Figs. 3 and 4, is similar to the one just explained, that is, the same base 1, arm 2, solenoid 3, distributor switch 12 and main snap switch 14 are employed, but instead of the wheel 18, bar 42, and wheel 46 being used, a spring pointer arm 51 is substituted. This pointer arm is pivoted to the base 1 at 52 by an insulated pintel so that the pointer will not make electrical contact with anything except certain bent teeth of the saw 53. The arm, however, is connected to an insulated wire 54 which leads to the pivot connection 55 of the distributor switch 12, this pivot supporting the arm 56, as shown. At the upper end of the pointer arm 51, but upon the base 1, is an arc 57 having a number of spaced divisional lines 58 numbered 4 to 8 and which represents the point measurements of the teeth in the various saws, and since the pointer arm is alined with the divisional line 4, the saw 53, to be set, has 4 points or four teeth to the inch. At the pointer end of arm 51 is a fixed pin 59 positioned so that it may engage any one of the holes 60 in the base 1, and thus prevent the arm 51 from moving when once set. At the lower end of the pointer arm is a flexible electrical contact brush 61 positioned to make contact with any of the teeth of the saw which is bent downwardly. This type of control is workable when one tooth of the saw to be set is bent into position in that the control arm 51 can not make contact with the unset teeth. The electrical circuit is completed by grounding one of the lead-in cord wires to the base at 62. By this arrangement, a portion of the solenoid winding is energized every time the brush 61 makes contact with a previous set tooth because the blade of the saw is grounded by its contact with the conductor base 1.

Figure 5:
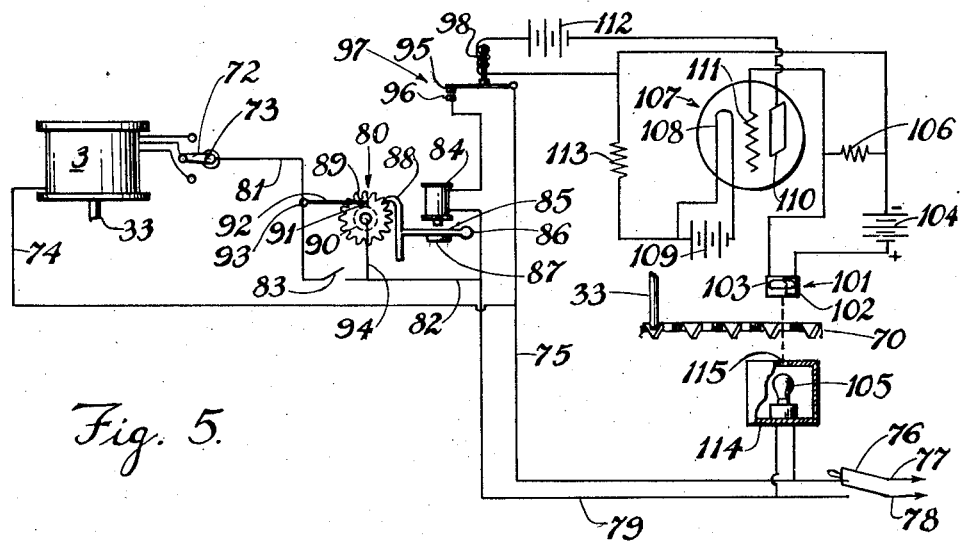
Fig. 5 is a schematic layout showing another form of the invention involving a beam of light.

The form of the invention shown in Fig. 5 is for substantially the same invention as shown in the other figures of the drawing except that the means for operating the hammer 33 is accomplished automatically by the well known electric eye device. The saw is indicated in this particular form of the invention by the numeral 70, some of the teeth of which have been set, as shown. The hammer 33 at the saw was broken away so that the balance of the hammer and the solenoid 3 could be placed in a better position for the sake of illustration.

The coil 3 has a number of taps contactable by a switch arm 72 which is pivoted at 73, the other end of the coil winding having a lead 74 extending therefrom which makes connection with a wire 75 that connects with one side of a double pole switch 76, the live side of same having connection with a wire 77 that leads to one side of a suitable source of electric current supply such as the usual house alternating current of 60 cycles at 110 volts. The other wire from the supply is indicated at 78 which connects with the other terminal of the switch 76, and from which switch a wire 79 extends; the wires 75 and 79 being the main current supply for the heavy duty equipment of the circuit.

Between the pivot 73 and the main wire 79 is a rotary switch 80 designed to alternately turn on and off current to the solenoid or close the wires 81 and 82. A hand operable switch is shown in parallel, however, at 83 so that the plunger or hammer 33 can be worked independently of the automatic switch 80.

The switch 80 is operated by an electromagnet 84 which has its coil connected in the main supply line 79. The extended core of the electromagnet, when energized, attracts the armature 85 which is fixed at the point 86, a stop 87 limits the distance the armature 85 can space itself from the core of the electromagnet. At the free end of the armature 85 is a vertically movable bar having on the top end thereof a dog or detent 88 which is arranged and adapted to move a toothed wheel 89 one tooth each time the detent is pulled downwardly by the armature 85 when released by the electromagnet. The detent is made flexible so that on the upward stroke it can clear the tooth just above it in a manner well known in mechanical arts. An extended disc at one side of the wheel 89 has a plurality of current conducting segments 90 insulated from each other and spaced apart, so that a contact rider 91 will alternately be on and off a segment as the disc is intermittently rotated by the detent 88, that is, one tooth at a time. The contactor 91 is fixed to one end of a spring band 92 which in turn is fixed to a point 93 where it connects with the wire 81. A branch wire 94 connects the wire 82 with all the segments 90 of the disc. The electromagnet 84 cannot operate unless the contacts 95 and 96 are closed by the microswitch 97 which is operated by the midget electromagnet 98.

The microswitch 97 is operated by an electric eye device which is controlled by the teeth in the saw 70. The reference character 101 represents a photo-electric cell having a cathode 102 of sodium, potassium, or other metal which gives off electrons when subjected to the influence of light, and an anode 103. A battery 104 is placed in the circuit with this cell and the current which passes through the cell when exposed to the influence of a light source, the small incandescent lamp 105, is caused to flow through the high resistance 106. In conjunction with this source of small currents is employed an electron discharge tube 107 comprising a cathode 108 of filamentary form provided with means for heating, consisting of a battery 109, which may be the low voltage side of a small transformer, an anode 110 and a conducting body 111 in the form of a grid interposed between the cathode and the anode. In circuit with the cathode and the anode is placed a battery or other source of current 112 and a resistance 113, the value of which bears a given ratio to that of the resistance 106. In series with the battery 112 is the coil of the midget electromagnet 98. By this arrangement of these electrical units, the midget electromagnet will be energized only when a beam of light from the source 105 reaches the light sensitive cell 101, which maintains the contacts 95 and 96 open until the light beam is broken by the point of one of the saw teeth. When the beam of light is broken, the electromagnet 84 raises the armature 85 while the heavy power current passes through the large solenoid 3 and forces the hammer 33 onto an unset tooth of the saw. When the beam of light again reaches the cell 101, the spring armature is again raised by the midget electromagnet 98 and causes the contacts 95 and 96 to open, which action de-energizes the electromagnet 84 to release the armature 85. When this armature is released, it returns to the stop 87 and slightly rotates the toothed wheel 89 just far enough to place the contact rider 91 on an insulated space of the disc so that the next tooth of the saw, which must be set in the opposite direction, is not set by the next breaking of the beam of light, that is, the hammer 33 cannot operate when the contact rider is not on a segment 90. In this manner, every other tooth of the saw is set, and when it is desired to set the other teeth, the saw is turned over and run through the device again.

In order to assure exactness, so that the beam of light will be broken only near the tip or point of the saw teeth, the light source 105 is placed in a light sealed box 114 provided with a very small slit for the light to escape and strike the cell 101. The light cell itself is also placed in the same kind of a box with a small slit for the light beam to enter. This is done so that other sources of light will not operate the electric eye device.

Figure 6:
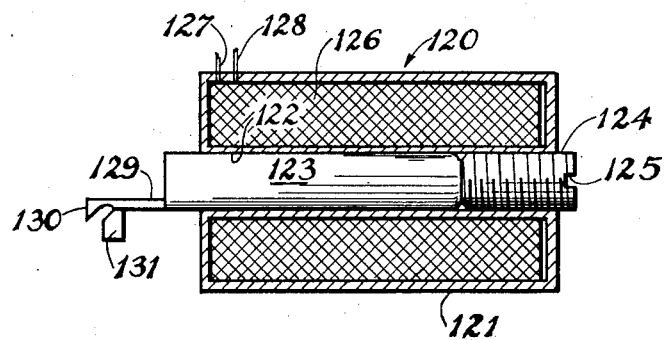
Fig. 6 shows an elevational view, partly in section, of a preferred form of an electro-magnet to be employed in the invention.

In Fig. 6 of the drawings, there is shown a preferred form of a hammer and magnet arrangement that may be used most successfully in this invention and which forms a part of the invention. The magnet is indicated at 120 having an iron clad shell 121 in which is a through bore 122 adapted to accommodate the sliding plunger or armature 123 and the adjustable magnetic intensifying threaded plug 124 which is slotted at 125 to receive an end of a screw driver so that the plug can be adjusted like a set screw. Within the shell is the electrical winding 126 having its ends 127 and 128 passing through the shell for connection with a suitable source of electric current that has an electric switch so that the magnet can be operated at will by merely closing the switch.

At one end of the magnetic plunger 123, there extends an arm 129 having at its end the biased hammer head portion 130, the slanted surface of which is adapted to bend a tooth of a saw against the slanted surface of the anvil part 131, the anvil being securely fixed to a suitable support and the plunger 123 provided with proper guides so that the work of bending the teeth on a saw will be perfect.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described our invention, what is claimed as new and desired to be secured by Letters Patent is:

1. In a teeth setting device for saws and the like, a base element having a top surface with adjustable guides thereon adapted to engage the teeth edge of the blade of a saw, an anvil supported by the base element intermediate the said guides, a solenoid supported by an arm extending from the base element, a plunger in the solenoid having a hammer end which is alined with the anvil and adapted to strike it, spring means supported by the solenoid and attached to the plunger, for constantly urging its hammer end away from the anvil, and switch means adapted to follow the teeth of a saw which has a plurality of electrical contact points arranged along the circumference of a circle, and electrical connection means for supplying current to the solenoid when part of the connection means makes contact with one of the contact points.

2. A teeth setting device for hand saws and the like, a base element having a top surface with guide means thereon for alining the teeth edge of a saw with a pair of moving parts, one of the parts being an electric switch having means for contacting the teeth of a saw and the other part being a reciprocable plunger, anvil means at the surface of the base element in alinement with the plunger and adapted to be struck by an end thereof, a solenoid supported by an arm extending from the base element and surrounding the plunger for operating it, means on the solenoid for returning the plunger from the anvil, and a supply of electrical current having one leg thereof connecting with a coil of the solenoid and the other leg connecting with one side of said switch, and an electrical conductor connecting the other side of the switch with another part of the solenoid, the switch being operable as it rides along the teeth of the saw to be set.

3. In a device for setting the teeth of saws, the device including a base element having a top surface with an anvil set therein and a saw blade guide means supported by the base element on each side of the anvil and alined therewith, an arm extending from and fixed to a rear portion of the base element and extending forwardly and supporting a solenoid at the distal end thereof, a plunger in the solenoid having a hammer end which is alined with the anvil and reciprocable so that it can strike the anvil, spring means at one end of the plunger for recoiling it, an electric switch having means which contact the teeth of the saw to be set and which switch is operated by the saw teeth when the saw is shifted, and a source of electric current having electrical conductors connecting the switch and solenoid in series relationship.

4. The device recited in claim 3 wherein the base element has an elongated groove with a shiftable bar thereover which has studs that ride in the groove, said switch including a toothed wheel pivoted to one end of the bar and having a plurality of contact buttons thereon, adjustable means at the other end of the bar to adjust the position of the wheel, and an electrical conductor spring means for making and breaking contact with each of said buttons in sequence.

5. The device recited in claim 3 wherein the base element is provided with an elongated groove, a shiftable bar over the groove, studs extending from under the bar into the groove which are adapted to slide in the groove, the switch including a toothed wheel pivoted to one end of the bar, a plurality of electrical contact buttons spaced apart in a circle on the top of the wheel, a knob pivoted to the top surface of the base element having an eccentric positioned groove on the underside thereof, a stud upstanding from the knob end of the bar which slides in the groove of the knob so that rotating of the knob can shift the wheel toward and from the anvil, and graduations along the perimeter of the knob indicating the number of points on saws.

BURR N. ENGLE.
JOHN B. ENGLE.

REFERENCES CITED

The following references are of record in the file of this patent:

UNITED STATES PATENTS

| Number | Name | Date |
| --- | --- | --- |
| 28,252 | Carrier | May 15, 1860 |
| 135,752 | Baker | Feb. 11, 1873 |
| 396,406 | Lewis et al. | Jan. 22, 1889 |
| 709,013 | Hillstrom | Sept. 16, 1902 |
| 1,168,352 | Wardwell | Jan. 18, 1916 |
| 1,373,308 | Davison | Mar. 29, 1921 |
| 1,481,175 | Anderson | Jan. 15, 1924 |
| 1,794,695 | Juhl | Mar. 3, 1931 |
| 1,819,139 | Weibull et al. | Aug. 18, 1831 |
| 1,853,695 | Mortimer | Apr. 12, 1932 |
| 1,878,396 | Hawes | Sept. 20, 1932 |
| 1,924,431 | Zingheim | Aug. 29, 1933 |
| 2,109,161 | Biro | Feb. 22, 1938 |
| 2,180,899 | Gaede | Nov. 21, 1939 |
| 2,371,358 | Sekella | Mar. 13, 1945 |